United States Patent Office 3,637,576
Patented Jan. 25, 1972

3,637,576
EPDM RUBBER INSULATING COMPOSITION
Gordon Sutherland, Wilmington, Del., assignor to the United States of America as represented by the Secretary of the Navy
No Drawing. Filed Apr. 22, 1970, Ser. No. 30,970
Int. Cl. C08g 37/18
U.S. Cl. 260—38
10 Claims

ABSTRACT OF THE DISCLOSURE

An insulating composition for the inside of rocket motors comprising (1) a rubber comprising ethylene, propylene and a diene selected from the group consisting of methylylidene norbornene and ethylidene norbornene, (2) carbon or silica (3) asbestos (4) zinc oxide and (5) bromomethyl alkylated phenolformaldehyde resin.

BACKGROUND OF THE INVENTION

This invention generally relates to insulating compositions for the inside of rocket motors and more particularly to insulating compositions based on rubbers comprising ethylene, propylene and a diene such as methylylidene norbornene or ethylidene norbornene (EPDM) cured with bromomethyl alkylated phenol-formaldehyde resin.

Insulating compositions for the inside of rocket motors are used to prevent the walls of the rocket motors from getting very hot when the rocket is in operation. The prior art has utilized insulating compositions which contain various rubbers such as SBR (styrene-butadiene elastomer) or EPDM (ethylene-propylene and dienes) in combination with other ingredients with some degree of success. Generally, many of these compositions were cured by using sulfur or peroxides. These compositions, however, did not necessarily possess low erosion rates, low char rates and the ability to easily bond to the solid propellants used in rocket motors.

SUMMARY OF THE INVENTION

Accordingly, one object of this invention is to provide an insulating composition for the inside of rocket motors.

Another object of this invention is to provide an insulating composition for rocket motors which has a relatively low char rate.

Still another object of this invention is to provide an insulating composition for rocket motors which has a relatively low erosion rate.

A still further object of this invention is to provide an insulating composition for rocket motors which is easily bonded to the propellants used in rocket motors.

These and other objects of this invention are accomplished by providing a composition comprising (1) a rubber of ethylene, propylene and a diene selected from the group consisting of methylylidene norbornene, ethylidene norbornene and mixtures thereof, (2) an opacifier such as carbon or silica, (3) asbestos, (4) zinc oxide and (5) bromomethyl alkylated phenol-formaldehyde resin.

DESCRIPTION OF THE PREFERRED EMBODIMENT

The rubber comprising one part of the insulating composition is composed of ethylene, propylene and a diene selected from the group consisting of methylylidene norbornene, ethylidene norbornene and mixtures thereof. These rubbers are well known in the art and their composition can vary. Thus, these rubbers are composed of from 10–90 mole percent of ethylene, from 0.1–20 mole percent of the diene with the remainder being propylene. In the instant insulating composition it is preferred that the ethylene content be between 45–65 mole percent and the diene content be between 0.1–10 mole percent with the remainder being propylene.

Carbon is added to the instant insulating composition for two reasons. The carbon acts as an opacifier for infrared energy from the exhaust flame and gases during the use as an insulating material in the firing of a propulsion motor. The carbon also acts as a reinforcing material in the rubber. From 1–60 parts by weight of carbon should be present in the composition per 100 parts by weight of the rubber. Silica can be used as a substitute for carbon in this composition though carbon is preferred.

The asbestos in the composition is generally added in the fiber form at the end of the mixing operation so that the fibers will not be degraded by excessive mixing. From 20 to 100 parts by weight of asbestos should be present in the composition per 100 parts by weight of the rubber.

Zinc oxide is also necessary in the instant insulating composition. The function of the zinc oxide is to react with any HBr that may be formed during the cure with the brominated phenolic resin curing agent hereinafter discussed. The zinc oxide may also function as a catalyst for the curing step but this is not definitely known. From 2 to 8 parts by weight of zinc oxide should be present in the composition per 100 parts of the rubber.

The brominated phenolic resin of the insulating composition is the curing agent. This product is phenol-formaldehyde resin which has been bromomethylated to yield the desired curing agent—bromomethyl alkylated phenol-formaldehyde resin. Commercially two products are readily available from Schenectady Chemicals, Inc., Schenectady, N.Y. These products are designated SP–1055 which has a 4% bromine content, and SP–1056 which has about a 6% bromine content. It should be noted, however, that such a resin with any bromine content will work to produce an insulating composition. From about 5 to 25 parts by weight of this resin should be present per 100 parts by weight of rubber.

The composition is cured under a pressure of 200–500 p.s.i. at a temperature between 320° F. and 370° F. but 350° F. is recommended. Curing time may vary from 45 minutes to 2 hours but at least one hour is preferred.

The general nature of the invention having been set forth, the following example is presented as a specific illustration thereof. It will be understood that the invention is not limited to this specific example but is susceptible to various modifications that will be recognized by one of ordinary skill in the art.

EXAMPLE

The carbon is ground to a fine powder (when it is available as a densified material). Any fine material used as an inert material or as a catalyst, if used in the mix, may be ground and mixed with the carbon. The raw rubber which comprises about 55 mole percent ethylene, about 3 mole percent ethylidene norbornene with the remainder being propylene, is milled for about 2 to 3 minutes and the carbon is then added over a period of about 2–3 minutes. Milling of the mixture is continued for about another 2 minutes. Steam is turned on to heat the mill rolls and milling is continued for about 2–3 more minutes under these conditions. The powdered curing resin is then added over a period of roughly 2–3 minutes and milling continues for about 2 additional minutes after said addition. The asbestos is then slowly added and milling continues for about 10 more minutes. The rubber mix is then partially cooled by passing cold water through the mill rolls. Zinc oxide is added over about a 2 minute period and the mixture is mixed for about 4 more minutes. The uncured insulation material is then taken off the mill as thin strips ready for molding.

The composition is cured by subjecting the mixture to a pressure between 200–500 p.s.i. at a temperature between about 320° F. and 370° F. with 350° F. being preferred. Cure time may vary from 45 minutes to 2 hours but generally one hour is required.

The composition in parts by weight prepared in the above manner is as follows:

| | |
|---|---|
| Rubber (55 mole percent ethylene, 3 mole percent ethylidene norbornene, remainder propylene) | 100 |
| Carbon | 1 |
| Bromomethyl alkylated phenol-formaldehyde resin (6% bromine) | 15 |
| Asbestos | 30 |
| Zinc oxide | 5 |

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An insulating composition comprising (1) a rubber comprising ethylene, propylene and a diene selected from the group consisting of methylylidene norbornene, ethylidene norbornene and mixtures thereof wherein ethylene comprises 10–90 mole percent of the rubber, the diene comprises 0.1–20 mole percent of the rubber and propylene comprises the remainder, (2) an opacifier selected from the group consisting of carbon and silica, (3) asbestos, (4) zinc oxide and (5) bromomethyl alkylated phenol-formaldehyde resin wherein for every 100 parts by weight of the rubber there are 1–60 parts by weight of opacifier, 20–100 parts by weight of asbestos, 2–8 parts by weight of zinc oxide and 5–25 parts by weight of bromomethyl alkylated phenol-formaldehyde resin.

2. The composition of claim 1 in the cured state.

3. The composition of claim 1 wherein said opacifier is carbon.

4. The composition of claim 3 in the cured state.

5. The composition of claim 1 wherein said rubber comprises from 10–90 mole percent ethylene, from 0.1–20 mole percent ethylidene norbornene with the remainder being propylene.

6. The composition of claim 5 in the cured state.

7. The composition of claim 5 wherein the opacifier is carbon.

8. The composition of claim 7 in the cured state.

9. The composition of claim 7 wherein there are 100 parts by weight of rubber, 1 part by weight of carbon, 5 parts by weight of zinc oxide, 30 parts by weight of asbestos and 15 parts by weight of bromomethyl alkylated phenol-formaldehyde resin which has a 6% bromine content.

10. The composition of claim 9 in the cured state.

References Cited

UNITED STATES PATENTS

| | | | |
|---|---|---|---|
| 3,402,140 | 9/1968 | Bickel et al. | 260—38 |
| 3,421,970 | 1/1969 | Daly et al. | 260—37 X |
| 3,534,119 | 10/1970 | Relyea | 260—846 X |

MORRIS LIEBMAN, Primary Examiner

S. M. PERSON, Assistant Examiner

U.S. Cl. X.R.

260—41.5 A, 846